(12) United States Patent
Neece et al.

(10) Patent No.: US 6,374,478 B1
(45) Date of Patent: Apr. 23, 2002

(54) METHOD FOR MANUFACTURING A CORIOLIS FLOW METER ASSEMBLY

(75) Inventors: Gregory Alan Neece, Westminster; James Vernon Decker, Broomfield; Clinton Ray Griffin, Erie; Edwin Arthur Hagerman, III, Broomfield; Curtis John Ollila, Westminster; Michael Leon Overfelt; Kevin Robert Piletic, both of Longmont; John Randolph Roper, Northglenn; Michael Benton Shelton, Longmont, all of CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/343,834

(22) Filed: Jun. 30, 1999

(51) Int. Cl.$^7$ ............................. G01R 3/00; B23K 1/00; B21D 39/04; G01F 1/86
(52) U.S. Cl. .................. 29/595; 29/890.14; 29/DIG. 4; 29/DIG. 48; 228/131; 73/861.357; 73/861.354
(58) Field of Search ............... 73/861.357, 861.354, 73/861.355, 861.356; 29/595, 602.1, DIG. 48, DIG. 4, 890.09, 890.14; 228/131

(56) References Cited

U.S. PATENT DOCUMENTS

| | | | |
|---|---|---|---|
| 4,049,184 A | * 9/1977 | Rozengart et al. | ........... 228/131 |
| 4,491,025 A | * 1/1985 | Smith et al. | ........... 73/861.357 |
| 4,823,614 A | * 4/1989 | Dahlin | ........... 73/861.357 |
| 5,157,975 A | * 10/1992 | Tanaka et al. | ......... 73/861.355 |
| 5,323,658 A | * 6/1994 | Yao et al. | ............... 73/861.357 |
| 5,344,717 A | * 9/1994 | Dutton et al. | .......... 73/861.355 |
| 5,351,561 A | * 10/1994 | Wenger et al. | ......... 73/861.357 |
| 5,381,697 A | * 1/1995 | Van Der Pol | .......... 73/861.357 |
| 5,616,868 A | * 4/1997 | Hagenmeyer et al. | . 73/861.357 |
| 5,850,039 A | 12/1998 | Van Cleve et al. | |
| 5,892,159 A | * 4/1999 | Smith | ..................... 73/861.354 |

FOREIGN PATENT DOCUMENTS

| | | |
|---|---|---|
| EP | 0733886 A2 | 9/1996 |
| EP | 0733886 | 9/1996 |
| EP | 0759542 | 2/1997 |
| EP | 0759542 A1 | 2/1997 |
| EP | 0849568 | 6/1998 |
| EP | 0849 568 A1 | 6/1998 |
| JP | 56-120941 | * 9/1981 ................. 29/595 |
| JP | 59-113970 | * 6/1984 ............. 29/DIG. 4 |

* cited by examiner

Primary Examiner—Peter Vo
Assistant Examiner—A. Dexter Tugbang
(74) Attorney, Agent, or Firm—Faegre & Benson LLP (57) ABSTRACT

A system for manufacturing a straight tube Coriolis Flowmeter. The system of this invention provides a process for connecting a flow tube assembly including a balance bar and a flow tube to at least two points inside a casing. The process provides an inexpensive way to use localized heat to affix the flow tube assembly to the two points. The use of localized heat reduces damage caused by expansion of components caused by heat as well reduces damage to electrical components in the casing.

20 Claims, 9 Drawing Sheets

METHOD FOR MANUFACTURING A CORIOLIS FLOW METER ASSEMBLY

FIELD OF THE INVENTION

This invention relates to a system for assembling a Coriolis flow meter having a flow tube having a straight configuration. More particularly, this invention relates to a system of assembly that joins components made of metals having dissimilar properties in a manner that reduces the amount of stress applied to the structure during assembly. Still more particularly, this invention relates to a system of assembly for enclosing a flow tube made of a first metal in a casing made of a dissimilar metal and attaching at least two points on each end of the flow tube to the casing.

Problem

It is known to use Coriolis effect mass flowmeters to measure mass flow and other information of materials flowing through a pipeline as disclosed in U.S. Pat. No. 4,491,025 issued to J. E. Smith, et al. of Jan. 1, 1985 and U.S. Pat. No. Re. 31,450 to J. E. Smith of Feb. 11, 1982. These flowmeters have one or more flow tubes of a curved or a straight configuration. Each flow tube configuration in a Coriolis mass flowmeter has a set of natural vibration modes, which may be of a simple bending, torsional, radial, or coupled type. Each flow tube is driven to oscillate at resonance in one of these natural modes. The natural vibration modes of the vibrating, material filled systems are defined in part by the combined mass of the flow tubes and the material within the flow tubes. Material flows into the flowmeter from a connected pipeline on the inlet side of the flowmeter. The material is then directed through the flow tube or flow tubes and exits the flowmeter to a pipeline connected on the outlet side.

A driver applies a vibrational force to the flow tube. The force causes the flow tube to oscillate. When there is no material flowing through the flowmeter, all points along a flow tube oscillate with an identical phase. As a material begins to flow through the flow tube, Coriolis accelerations cause each point along the flow tube to have a different phase with respect to other points along the flow tube. The phase on the inlet side of the flow tube lags the driver, while the phase on the outlet side leads the driver. Sensors at two different points on the flow tube produce sinusoidal signals representative of the motion of the flow tube at the two points. A phase difference of the two signals received from the sensors is calculated in units of time. The phase difference between the two sensor signals is proportional to the mass flow rate of the material flowing through the flow tube or flow tubes.

Coriolis flowmeters having a straight flow tube have several advantages over flowmeters having two flow tubes of a curved design. One advantage of straight tube flow meter is that single flow tube has a larger diameter which provides a flow path of a greater volume. The flow path having a greater volume reduces plugging, lowers the pressure drop of flowing material entering the meter, and facilitates the cleaning of the flow tubes. A second advantage is that the flow tube is straight. The straight flow tube facilitates cleaning of the flow tube and allows the flow tube to be self draining when oriented correctly.

However, the design of a Coriolis flowmeter having a straight flow tube presents many problems in the manufacture of such a flowmeter. A first problem is that the flow tube must be attached to the casing enclosing the flow tube for structural support. One particular problem with affixing a straight flow tube to a casing is that the flow tube and different components of the casing are made of different metals. Ideally, all of the components of a flowmeter would be made out of the same material and joining the various components would simplified. However, the cost of forming components from metals, such as titanium, Hastelloy, or zirconium, dictates that some components be made of less expensive materials. Typically, components such as the casing that do not have contact with the process material are made of less expensive metals than the metal used to form the flow tube. Sometimes, the components made of an inferior metal may then be covered with a veneer made of another material to provide a sanitary surface and to protect against corrosion of the casing.

The different metals have dissimilar properties which may make it difficult to join the metals by conventional methods such as welding. For example, a flow tube may be made of Titanium while an end of a casing is made of stainless steel. The thermal coefficient of Titanium is 5.3 microin/in ° F. and the thermal coefficient of stainless steel is 9.6 microin/in ° F. The disparity between thermal coefficients of expansion make it desirable to use rapid and localized heating to braze elements to limit the effects of the disparity.

A second problem in the connection of straight flow tube to the casing is the electronic components connected to the flow tube. Electronic components include a driver, pick-off sensors, and temperature sensors. These electronic components must be installed on the flow tube and balance bar prior to joining the flow tube and housing. If high temperature joining processes are then used to join the flow tube and casing, the electronic components may be destroyed or damaged by the high temperature.

Any assembly system that solves the above problems must be economical. If the assembly system increases the cost of manufacture, the flowmeters may become too expensive to manufacture and thus cost prohibitive to sell.

SOLUTION

The above and other problems are solved and an advance in the art is made by the assembly system of this invention. The assembly system of the present invention is a low cost method for assembling a straight tube Coriolis flowmeter. The system of this invention brazes components in a localized manner to reduce the effects of thermal expansion and to prevent damage to electrical equipment.

In the assembly system of this invention, a Coriolis flowmeter having a straight flow tube is assembled in the following manner to form a flow tube assembly. The process begins by joining a straight flow tube made of a first metal to a balance bar that is oriented substantially parallel to a longitudinal axis of the straight flow tube and that encloses a portion of said straight flow tube. In a preferred embodiment, the balance bar is made of a metal having substantially the same properties as the first metal of the flow tube and the ends of the balance bar are vacuum brazed to the flow tube.

After the flow tube and balance bar are joined to form a flow tube assembly, a drive system and sensors are installed onto the flow tube assembly. The flow tube assembly is then inserted into the casing. The casing is made of a second metal that has dissimilar properties to the first metal. Each end of the flow tube assembly is then joined to at least two points inside the casing using rapid and localized heating. Each point where the flow tube assembly is joined to the casing must be facilitated by a dissimilar metal.

An end of the flow tube assembly is connected to one of the at least two points in the following manner. Case connects are affixed to opposing ends of said straight flow tube and said balance bar. These case connects may be vacuum brazed on to the flow tube assembly at the same time the balance bar is joined to the flow tube. Alternatively, the case connects may be joined to the flow tube assembly after the straight flow tube and the balance bar are joined. Case connects are members that protrude out from the balance bar and flow tube. The case connects are made of a metal having properties substantially similar to both the first and the second metal. This allows the case connect to be brazed to the flow tube assembly and to be welded to the casing. In a preferred embodiment, the case connects are vacuum brazed to the ends of the flow tube and balance bar.

After the flow tube assembly is inserted into the casing, the case connects are affixed to inserts on an interior surface of the casing. The inserts are protruding ledges at opposing ends of the casing. The inserts are made of a metal that has properties that are substantially similar to the metal of the case connect. In a preferred embodiment, the case connect and inserts are welded together by conventional methods.

Also after the flow tube assembly is inserted into the casing, a driver, sensors, and temperature sensors on the flow tube and balance bar are connected to wires that feed through the casing. The wires are connected through the aperture in the casing.

In a preferred embodiment, a second point of attachment for each end of the flow tube is with a case end. The case end is an end covering that is mated with the opposing openings of the aperture. An aperture through the case end allows the flow tube to protrude through the case end. The flow tube is connected to the case end after the flow tube and balance bar have been connected to the casing.

In a preferred embodiment, the flow tube is connected to the case connect in the following manner. After the case connects are welded to the inserts in the casing, each case end is inserted over an end of the flow tube and affixed to an end of the casing over an end of the aperture in the case end. One manner of affixing a case end to an end of the casing is by welding the case end to the casing. Welding is used in the preferred embodiment because the case end is made of stainless steel and the casing is made of Carbon steel.

After the case end is connected to the casing, the case and flow tube are joined. In a preferred embodiment, the case end and flow tube are joined in the following manner. First, a brazing material is placed inside the case end on a lip around the inside circumference of the case end. The case end is then inserted over the flow tube and tacked in place on the casing. The case end is then welded to the casing. The flow tube is then affixed to the case by induction brazing the lip of the case end and the flow tube.

Alternatively, a transition piece is affixed to the flow tube to extend out from the flow tube. The transition piece is made of metal having properties substantially similar to said first metal and the second metal. The transition piece is vacuum brazed to the flow tube after the balance bar has been affixed. The transition piece is then welded into place after the case end is connected to the casing.

After the flow tube assembly is connected to the second of the two points inside the casing, the access openings through the casing are sealed. The access opening are openings through the casing that allow access to components of the flow tube assembly for adjustments after installation into the casing.

A pneumatic test is performed after the access openings are sealed. The pneumatic test pressure rates the casing. After the pneumatic test are complete, a pneumatic opening is sealed. The pneumatic opening is an opening that allows pneumatic test equipment to be inserted into the housing.

The casing is then enclosed in a veneer. The veneer is a covering that provides a sanitary outer surface for the casing. In the preferred embodiment, the veneer is stainless steel and is affixed in the following manner. The veneer is wrapped around the casing. The sides of the wrapped veneer are then welded together by a longitudinal weld. The circumferential ends of the veneer are then affixed by an orbital weld to stainless steel case ends.

A final step in a preferred embodiment is to affix process connections to opposing ends of the flowmeter. The process connections are formed of the first metal of the flow tube and the metal from which the case end is made. The process connection are inserted over the ends of the flow tube and then welded to the case ends of the casing. The first metal in the process connections encloses at least a portion of an aperture through the process connection. The flow tube is welded to the first metal enclosing the portion of the aperture after the process connections are joined to the case ends.

DETAILED DESCRIPTION

The above and other features of this invention can be found in the detailed description below and the following drawings.

DETAILED DESCRIPTION

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art.

In the drawings, like numbers refer to like elements throughout.

The present invention is a system that provides a method for assembling a straight flow tube Coriolis flowmeter sensor. The system provides an economical method for assembling a sensor that limits the amount of direct heat applied to components in the sensor. The limiting of amount of direct heat applied to components in the flowmeter reduces the amount of stress on the sensor caused from disparaging coefficients of thermal expansion of the different metals used to make the different components. The limiting of direct heat also reduces damage to electronic components that must be installed prior to the final steps requiring welds or some other heating process to join metals.

Figure 1:
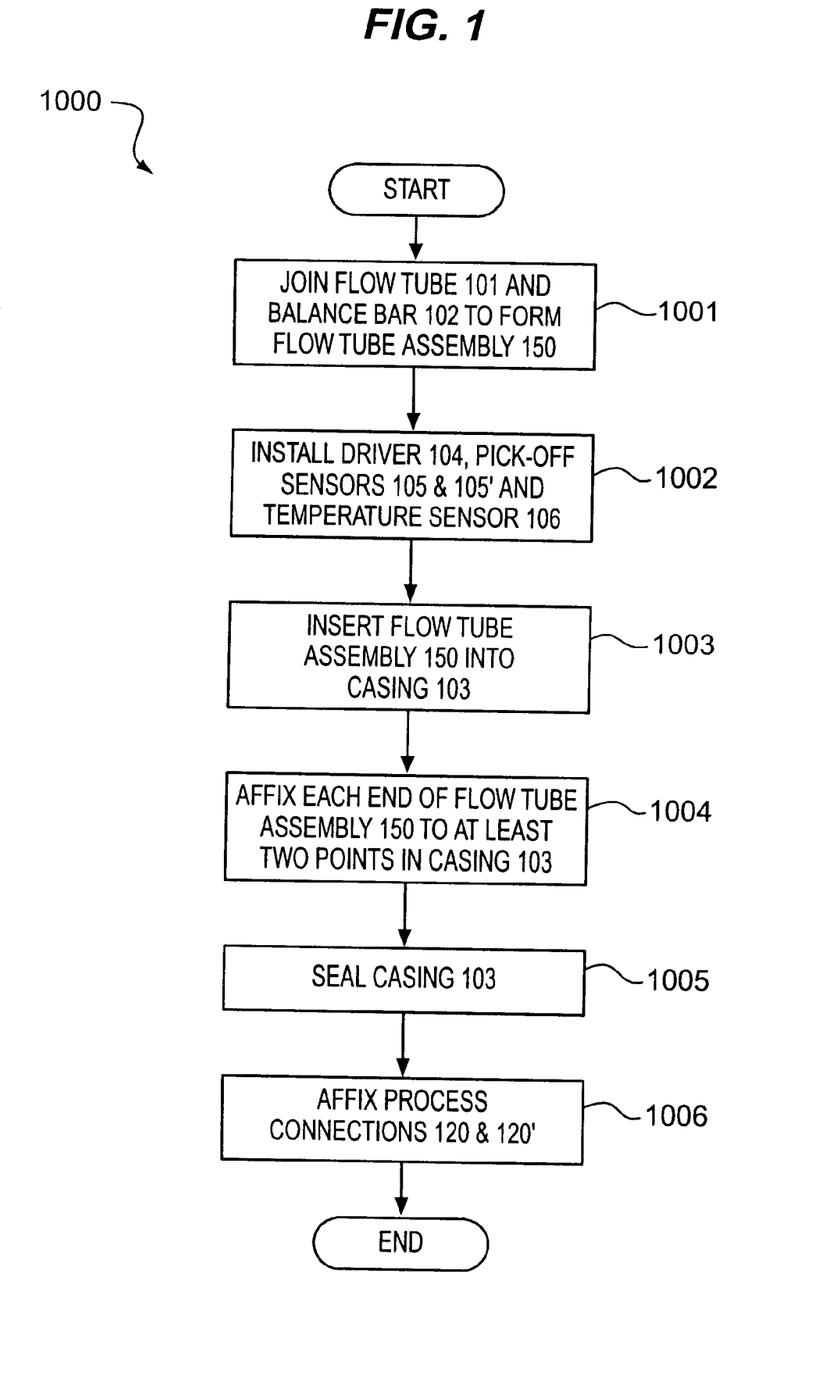
FIG. 1 illustrating a method for assembling a straight tube Coriolis flowmeter in accordance with this invention.
Figure 6:
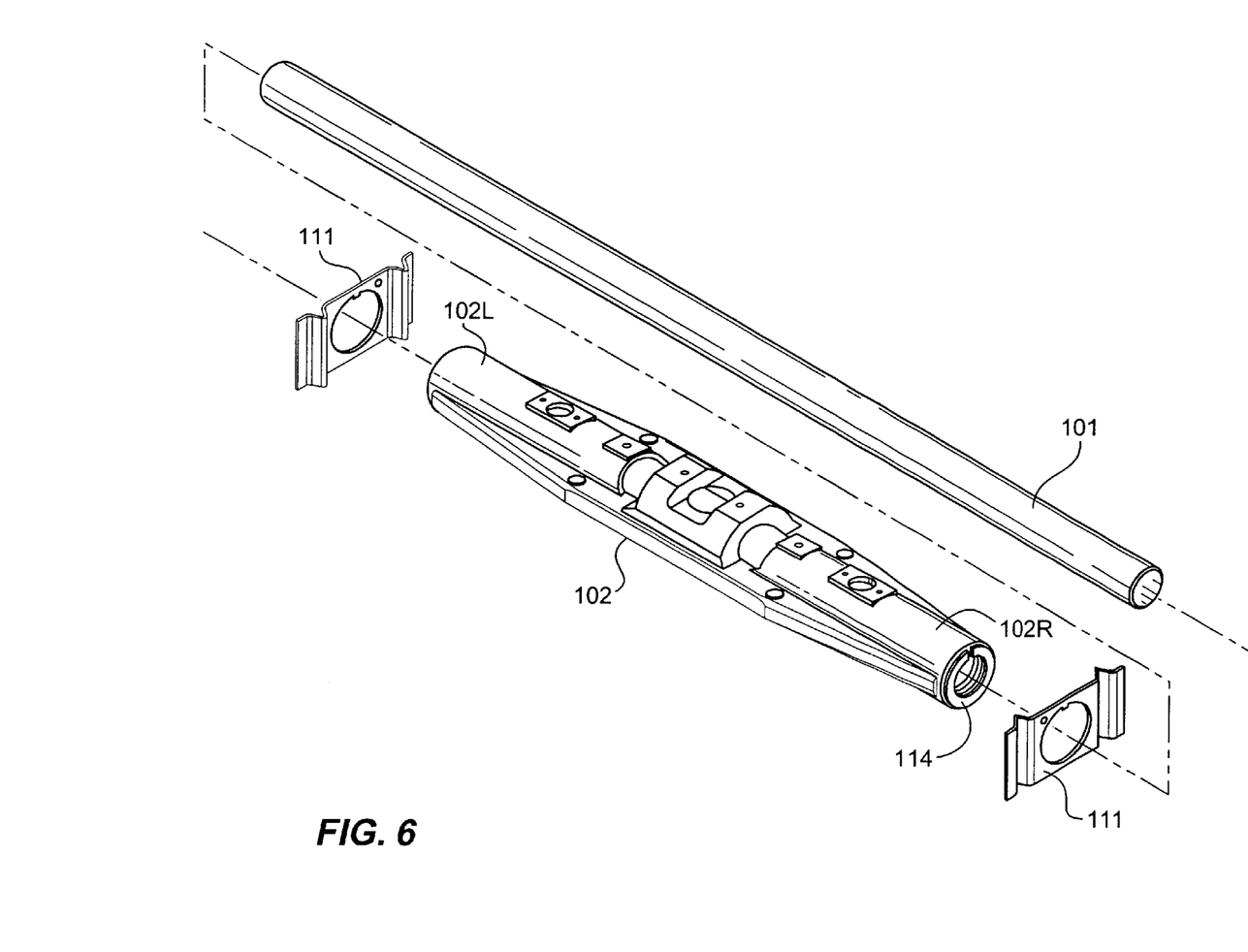
FIG. 6 illustrating components of a flow tube assembly.
Figure 7:
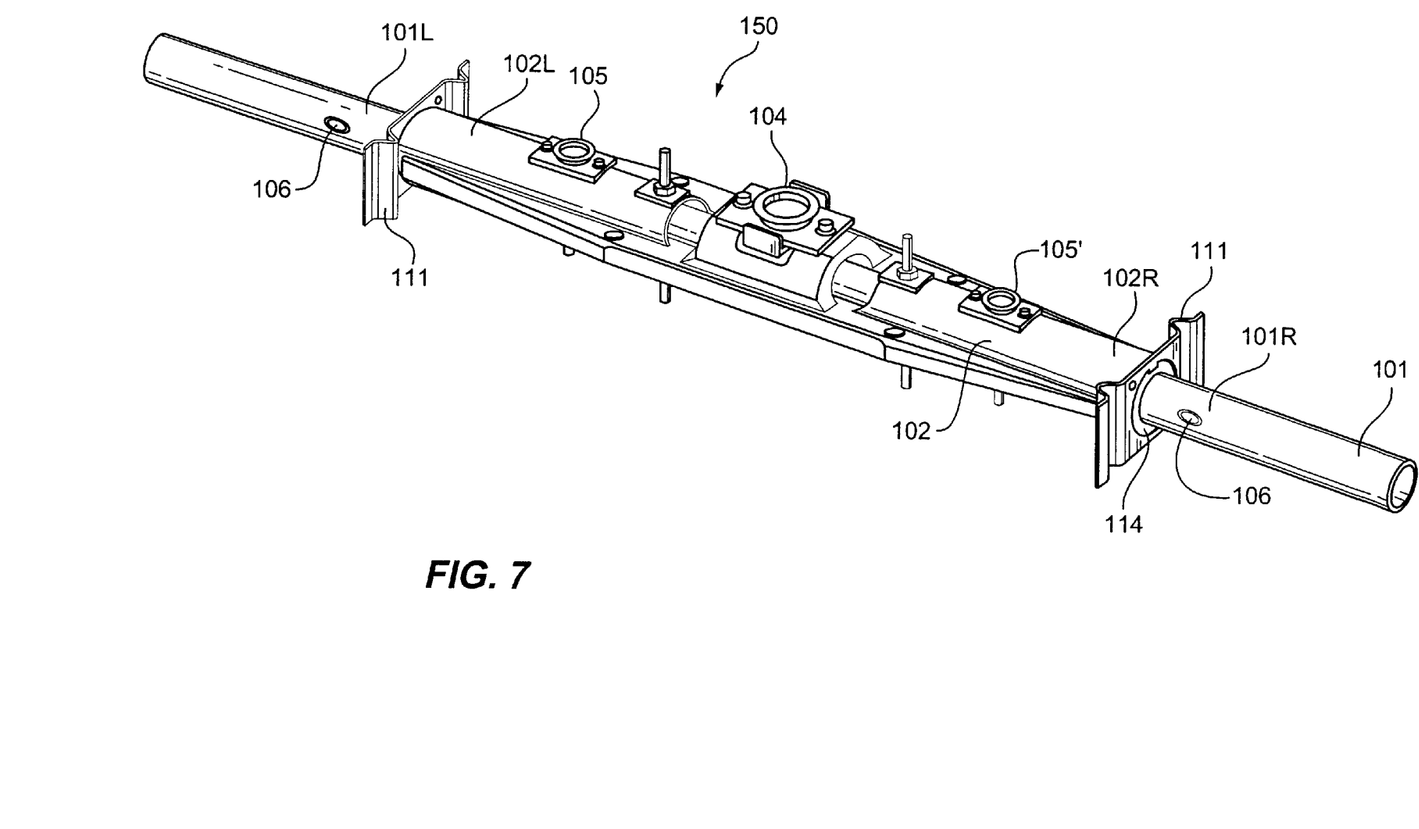
FIG. 7 illustrating a completed flow tube assembly.

FIG. 1 illustrates a process 1000 for assembling a straight tube Coriolis flowmeter in accordance with this invention. Process 1000 begins in step 1001 by joining a flow tube 101 (See FIG. 6) and a balance bar 102 (See FIG. 6) to form a flow tube assembly 150. Balance bar 102 (See FIG. 6) is oriented parallel to a longitudinal axis of flow tube 101 (See FIG. 6). Opposing ends 102L and 102R of balance bar 102 (See FIG. 7) are joined to flow tube 101 proximate ends 101L and 101 R. Ends 101L and 101 R extend past ends 102L and 102R of balance bar 102. A completed flow tube assembly 150 is shown in FIG. 7.

Case connects 111 (See FIG. 6) may also be connected at this time. In a preferred embodiment, balance bar 102 and case connects 111 are joined to flow tube 101 using a vacuum brazing technique although other types of joining may be used. Vacuum brazing is used because it provides even heating of components, part alignment, and the ability to use vacuum brazing to join parts of dissimilar thickness. A preferred embodiment of step 1001 is given in FIG.2.

After flow tube assembly 150 is formed, driver 104, pick-off sensors 105–105', and temperature sensors 106 are installed on flow tube assembly 150 in step 1002 of FIG. 1. A completed flowmeter assembly with installed components is shown in FIG. 7. Driver 104, pick-off sensors 105–105', and temperature sensors 106 must be installed prior to inserting flow tube assembly 150 into a casing because access to the inside of the casing is limited.

Figure 8:
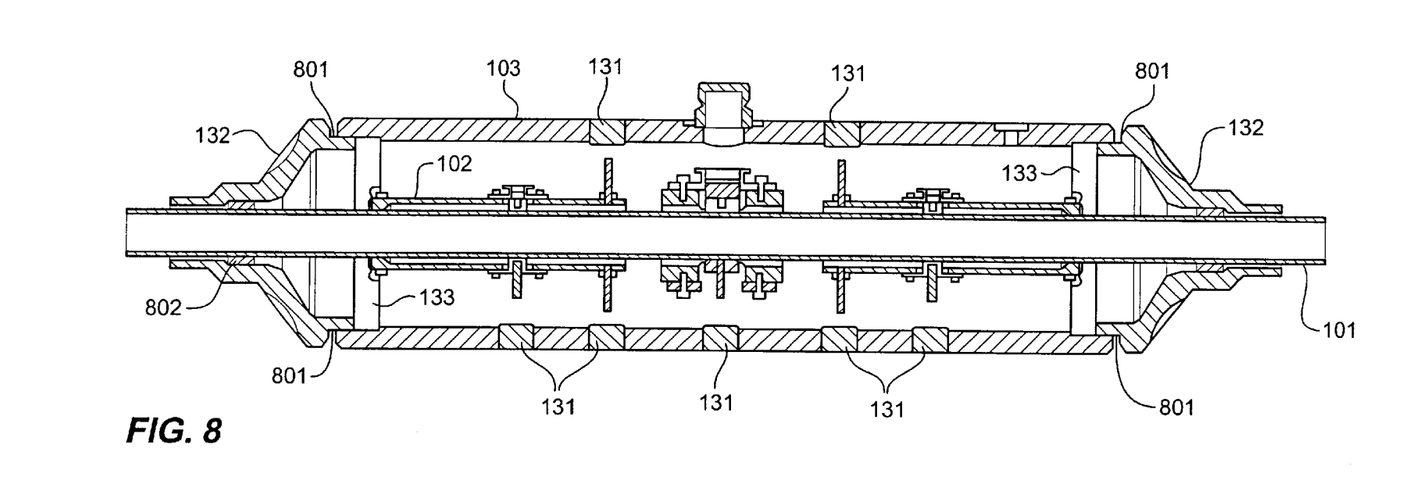
FIG. 8 illustrating a flow tube assembly inserted into a casing.

After the electronic components have been installed in step 1002 of FIG. 1, flow tube assembly 150 is inserted into a casing 103 in step 1003. A cross sectional view of flowmeter assembly 150 inserted inside casing 103 is shown in FIG. 8. In step 1004, localized heat is used to affix flow tube assembly 150 to at least two points inside casing 103. Flow tube assembly 150 must be connected to at least two points inside casing 103 to reduce the number of vibrational nodes that are excited. A complete explanation of the reasons for affixing flow tube 150 to at least two points inside casing 103 is provided in a patent application titled "Apparatus for connecting a Coriolis Flowmeter Flow Tube to a Flowmeter Casing" assigned to Micro Motion Inc. of Boulder Colorado and filed on the same day as this application. A preferred method of using localized heat to affix flowmeter assembly 150 to two points inside casing 103 is provided in FIG. 3.

Figure 11:
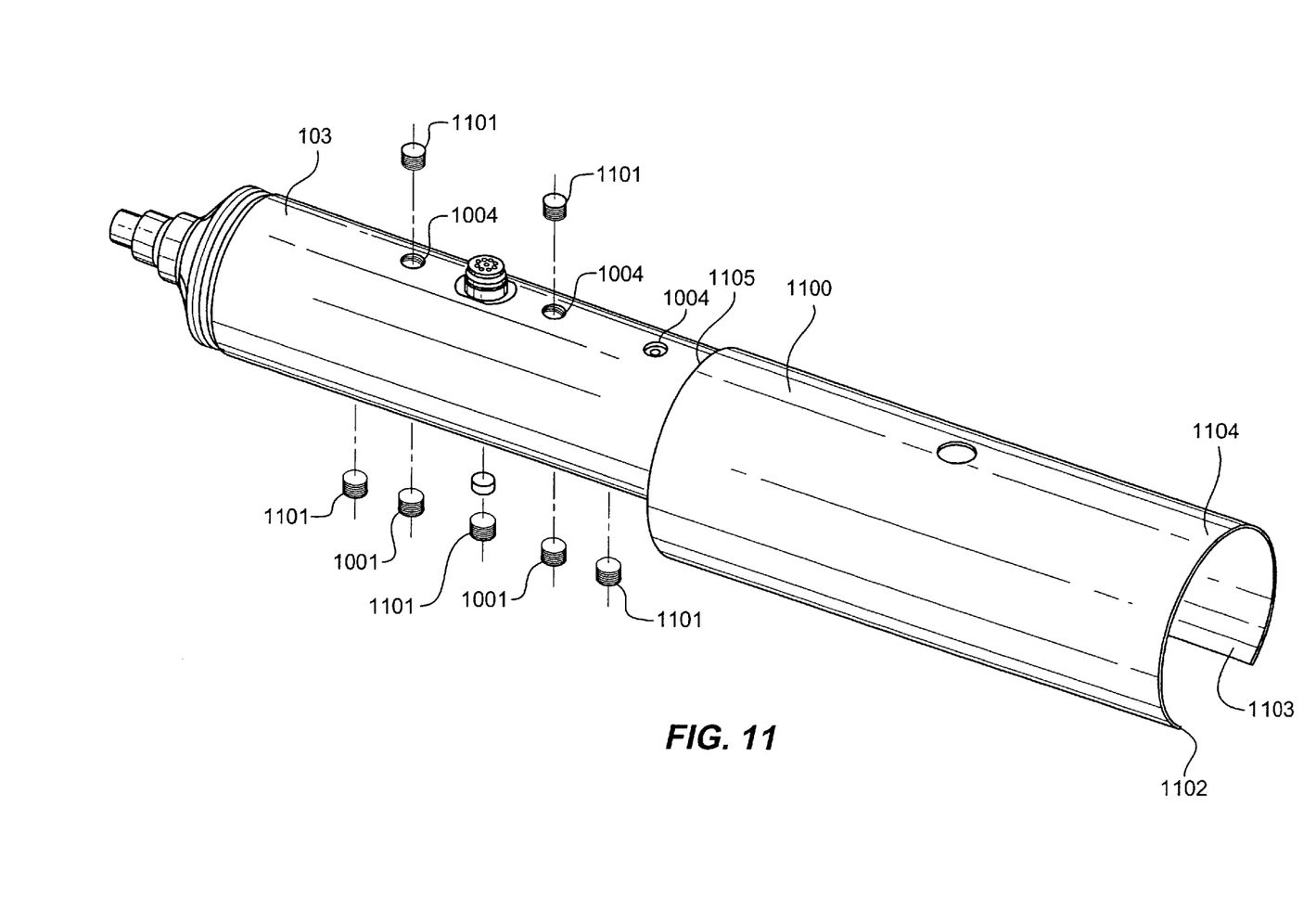
FIG. 11 illustrating an exploded view of a veneer that encloses a casing.

After flow tube assembly 150 is affixed to at least two points in casing 103, the casing is sealed in step 1005. The sealing is done by inserting plugs in all remaining openings in casing 103 and using some manner such as welding to affix the plugs into place. As shown in FIG. 11, plugs 1101 are inserted into access openings 1002. Plugs 1101 are then welded or in some other manner affixed into place. Veneer 1100 is then affixed to casing 103 to enclose casing 103. A preferred exemplary embodiment of step 1005 is given in FIG. 4.

Figure 12:
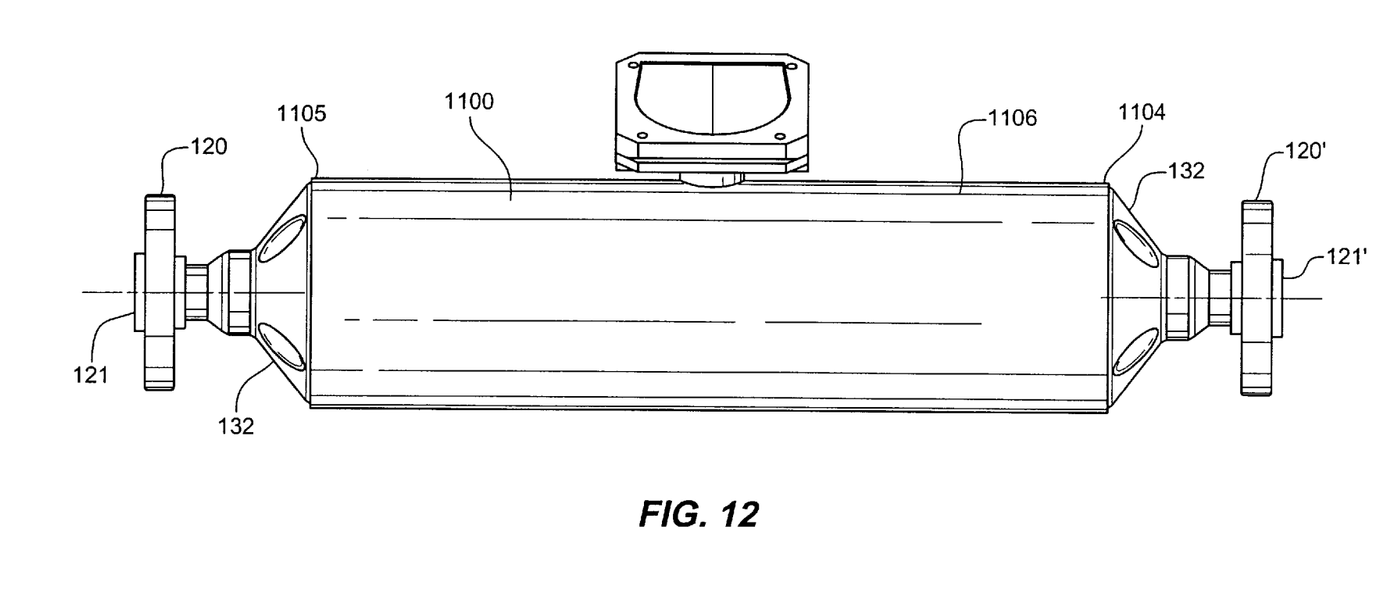
FIG. 12 illustrating an flowmeter with process connections affixed to the casing.

In step 1006, process connections 120–120'(Shown in FIG. 12) are affixed to opposing ends 101L and 101R of flow tube 101 to complete process 1000. At least a portion of process connections 120–120' is made of the same metal as flow tube 101. The portion of process connections 120–120' made of the same metal as flow tube 101 includes a portion that encloses part of an aperture through the process connection. The portion enclosing the aperture is joined with flow tube 101. This provides a flow path through the flowmeter that is enclosed by a single type metal.

A patent application titled "A CORIOLIS FLOWMETER HAVING BI-METALLIC PROCESS CONNECTIONS" assigned to Micro Motion Inc. and filed on the same day as this application provides a complete description of a process connections used in the preferred embodiment. A preferred embodiment for a process to complete step 1006 is shown in FIG. 6.

The following is a preferred exemplary embodiment of the process used to assemble a straight tube Coriolis flowmeter in accordance with this invention. In the following description, the steps of process 1000 in FIG. 1 are referenced as well as FIGS. 6–12 showing various components of a flowmeter during assembly.

Figure 2:
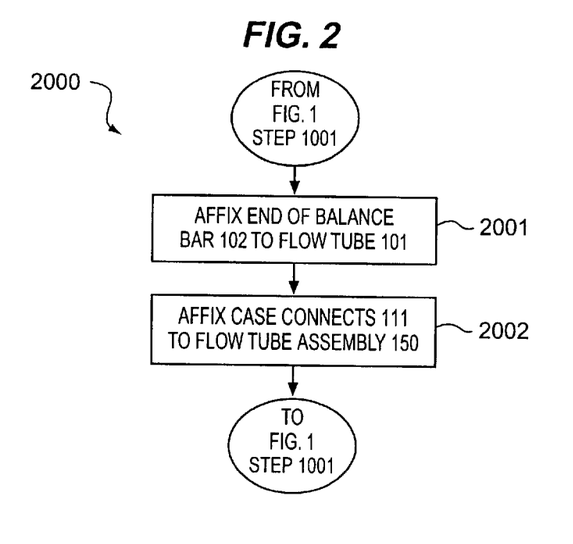
FIG. 2 illustrating a preferred process for joining a flow tube and a balance bar to make a flow tube assembly.

Process 1000 begins in step 1001 with the joining of flow tube 101 and balance bar 102 to form flow tube assembly 150. Process 2000 illustrated in FIG. 2 is a preferred embodiment of a process for completing step 1001. Process 2000 begins in step 2001 by affixing balance bar 102 to flow tube 101 to form flow tube assembly 150. As stated above, flow tube 101 and balance bar 102 are shown in FIG. 7.

In a preferred embodiment, flow tube 101 and balance bar 102 are made the same metal. For example, flow tube 101 and. balance bar 102 are made of titanium. Alternatively, flow tube 101 and balance bar 102 may be made of different metals. However, the different metal must have substantially similar properties. An example of metals having substantially similar properties are carbon steel and titanium. The substantially similar properties allows the different metals to be joined in conventional manners such as brazing and joining.

Since flow tube 101 and balance bar 102 are made of metals having substantially similar properties, a vacuum brazing technique may be used join flow tube 101 and balance bar 102. In this embodiment, flow tube 101 is inserted into balance bar 102. Balance bar 102 is oriented along a longitudinal axis of flow tube 101. Ends 102L and 102R are brazed to flow tube 101. Ends 101L and 101R of flow tube 101 extend outward from ends 102L and 102R of balance bar 102.

Figure 9:
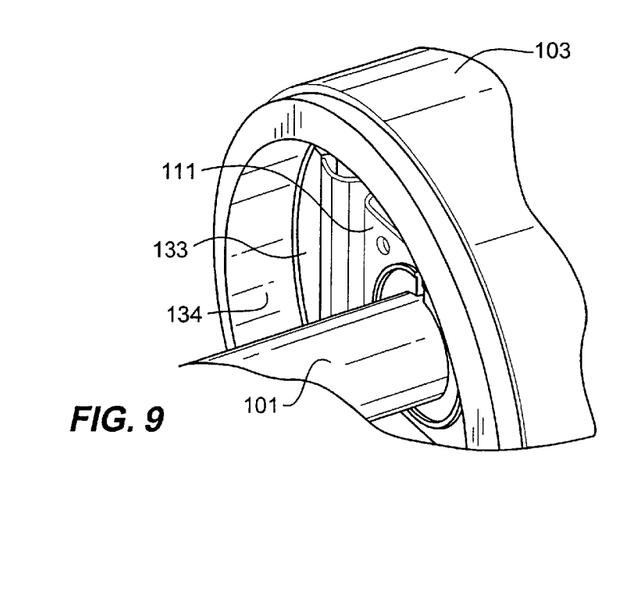
FIG. 9 illustrating a end of a casing prior to affixing of a case end.

Case connects 111 may be joined to flow tube assembly 150 as balance bar 102 (SEE FIGS. 6 and 7) is being affixed to flow tube 101. Alternatively, case connects 111 can be affixed to flow tube assembly 150 after balance bar 102 is affixed to flow tube 101 to form flow tube assembly 150. In a preferred embodiment, case connects 111 are affixed proximate ends 102L and 102R of balance bar 102. In a preferred embodiment, case connects 111 are vacuum brazed to flow tube assembly 150. Case connects 111 are wings that extend outward from flow tube assembly 150 to connect to casing 103 (as shown in FIGS. 7,8, and 9). Case connects 111 are made of a metal having substantially similar properties to the metal of flow tube 101. Case connects 111 must also be made of a material that has properties substantially similar to the metal of casing 103 in order to allow case connect 111 to be affixed to casing 103. In a preferred embodiment, case connects 111 are made of steel. Case connects 111 are disclosed in a patent application titled "Apparatus For Connecting a Coriolis Flowmeter Flow Tube to a Flowmeter Case" assigned to Micro Motion Inc. and filed on the same day as this application. After step 2002 is completed, process 2000 ends and returns to step 1001 of process 1000.

As seen in FIG. 1, driver 104, pick-off sensors 105–105', and temperature sensors 106 are installed on flow tube assembly 150 in step 1002 after flow tube assembly 150 is completed. Driver 104, pick-off sensor 105–105' and temperature sensors 106 are affixed in a conventional manner such as brazing, gluing, or welding. FIG. 7 illustrates a completed flow tube assembly 150.

After step 1002, flow tube assembly 150 is inserted into casing 103. In the preferred embodiment, casing 103 is a hollow tube. Flow tube assembly 150 is inserted into one end of the casing until flow tube 101 extends from a second end. As shown in FIG. 9 casing 103 has transition brackets 133 that mate with case connects 111 to connect flow meter assembly to the ends of casing 103. In the preferred embodiment, flow tube assembly must be oriented in a manner that case connects 111 fit between transition brackets 133 for insertion. After flow tube assembly 150 is inserted, flow tube assembly 150 is rotated so that ends of case connects 111 are mated with transition brackets 133. Step 1003 is then completed.

Figure 3:
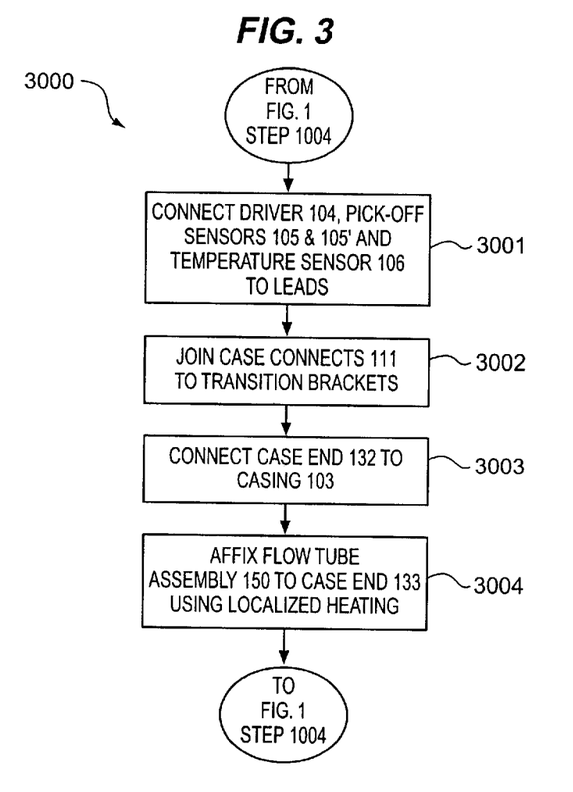
FIG. 3 illustrating a preferred method for affixing the flow tube assembly to a casing in this invention.

As shown in FIG. 1, each end of flow tube assembly 150 is affixed to at least two points inside casing 103 in step 1004 after flow tube assembly 150 is inserted into casing 103. Process 3000, as shown in FIG. 3, is a preferred exemplary of step 1004 of FIG. 1. Process 3000 begins in step 3001 by connecting driver 104, pick-off sensors 105–105' and temperature sensor 106 to leads (Not Shown) that extend through casing 103. This completes the wiring of internal components. After the wiring is complete, case connects 111 are joined to the transition brackets 133 inside casing 103 in step 3002. As shown in FIG. 9, transition brackets 133 are protrusions from an inside edge at the ends of an aperture 134 extending through casing 103. In the preferred embodiment, transition brackets 133 and case connects 111 are welded together in a conventional manner. However, those skilled in the art will appreciate that other forms of connection can be used. The weld of case connects 111 to transition brackets 133 places heat only on the case connects which reduces the thermal expansion of flow tube 101 and balance bar 102. Furthermore, the heat for welding is applied further away from electronic components such as driver 104. This reduces damage to the components caused by the heat of the welding process.

Figure 10:
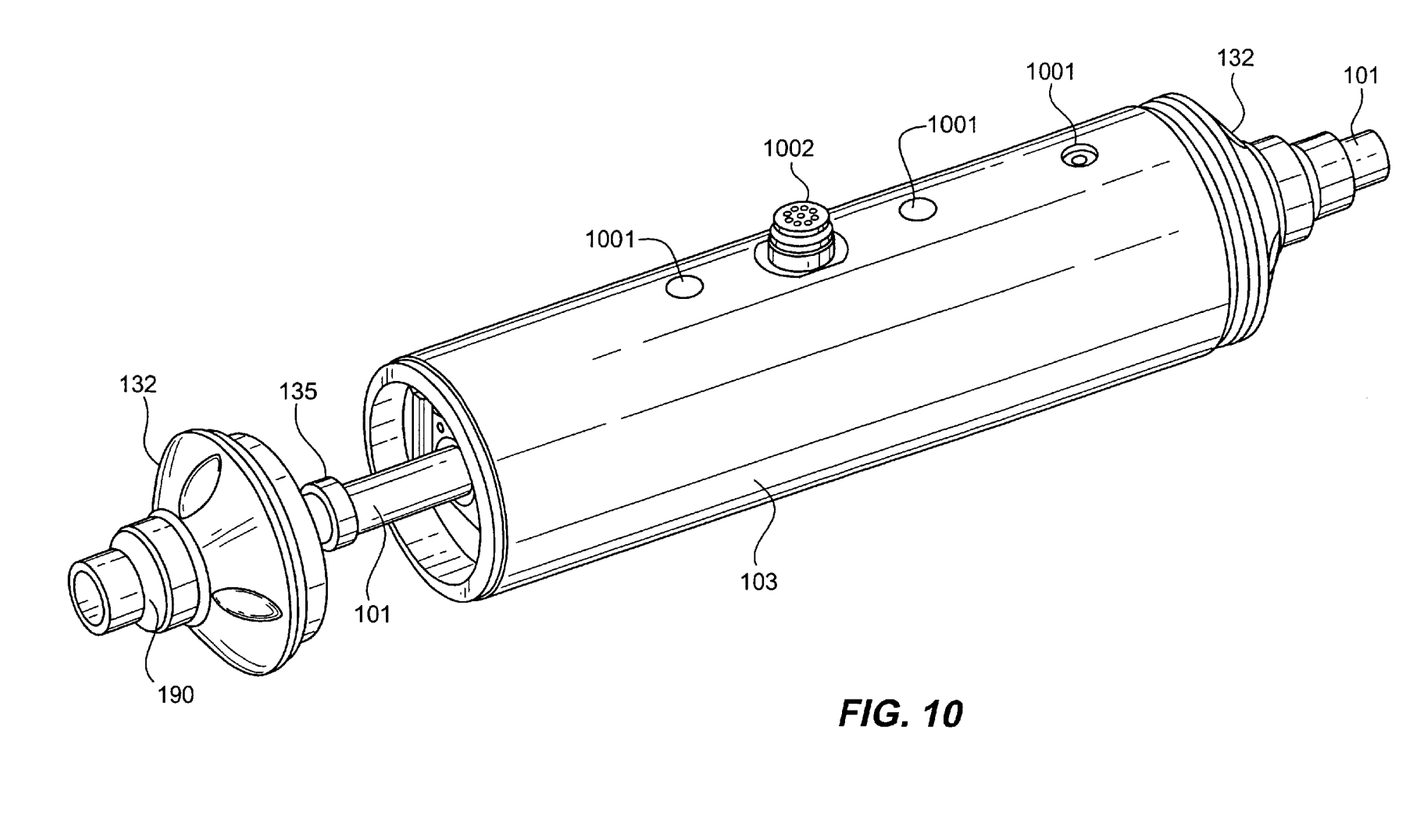
FIG. 10 illustrating an exploded view of a case end and a casing.

In step 3003, case ends 132 as shown in FIG. 10 are affixed to opposing ends of casing 103. Case ends 132 are caps having an aperture 190. Flow tube 101 extends through aperture 190 to connect with a process connection as described below. Case ends 132 enclose opposing ends of aperture 134 (FIG. 9) to enclose casing 103. In a preferred embodiment, case ends 132 are made of stainless steel.

Case ends 132 are affixed in the following manner. First, case ends 132 are inserted over ends 101L and 101R of flow tube 101. In a preferred embodiment, a brazing material is placed inside case end 132 at this time. The brazing material is positioned on a transition ring 802 (SEE FIG.8) that encloses an axial inner end of aperture 190. The brazing material will be used later to affix case ends 132 and flow tube 101. Case ends 132 are then welded around the circumference at position 801 (SEE FIG. 8) to case end 103. This can be done in the preferred embodiment because case ends 132 are made of stainless steel and casing 103 is made of carbon steel. Although it is possible to use other methods to affix the case ends 132 to casing 103.

After the case ends 132 are affixed to casing 103, case ends 132 are affixed to ends 101L and 101R of flow tube 101 in step 3004. In the preferred embodiment, this is done by applying heat to a local area to cause the brazing material to braze case end 133 and flow tube 101. The heat is only applied to a local area to reduce the area that expands and contracts due to the heat and to reduce damage to electronic components inside casing 103.

One manner of applying heat to a local area in this manner is induction brazing. Induction brazing is performed in the following manner. First, the casing 103 is placed in a chamber that holds a clean inert atmosphere or vacuum. One such atmosphere is an Argon atmosphere. This prevents contaminants, such as titanium oxide, from forming. The contaminants must be prevented from forming because contaminants inhibit braze flow from occurring to join the components. A heat sink is placed around the flow tube 101. The heat sink reduces the heat applied to other components and limits the expansion of flow tube 101.

After the flowmeter is properly placed inside the vacuum chamber, the chamber is closed and the atmosphere is removed by a vacuum pumping system. Alternatively, an atmosphere of an inert gas, such as Argon, may be added to the chamber. Heating loops are then used to heat case end ends 133 and ends 101L and 101R of flow tube 101 proximate case ends 133. Each heating loop contains an induction heating coil, power supply, and a pyrometer, thermo coupler or other control scheme for monitoring the temperature.

Before the heating cycle starts, a gettering system is initiated to remove the remaining oxygen and nitrogen from the system. The heating coils then heat the case ends 133 and flow tube 101. Once the flow tube 101 and case ends 133 have been brazed together, the chamber is filled with clean dry argon which is continuously recirculated. After case ends 133 and flow tube 101 are affixed, process 3000 ends and returns to step 1004 of process 1000 in FIG. 1.

Figure 4:
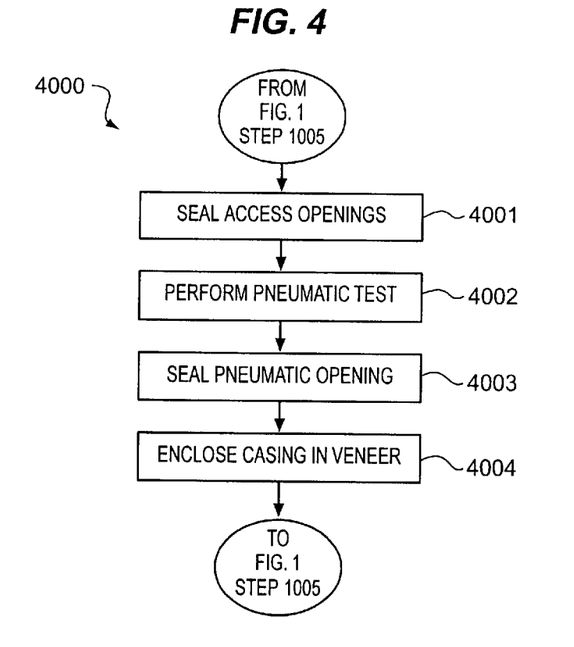
FIG. 4 illustrating a preferred method for sealing a casing in this invention.
Figure 5:
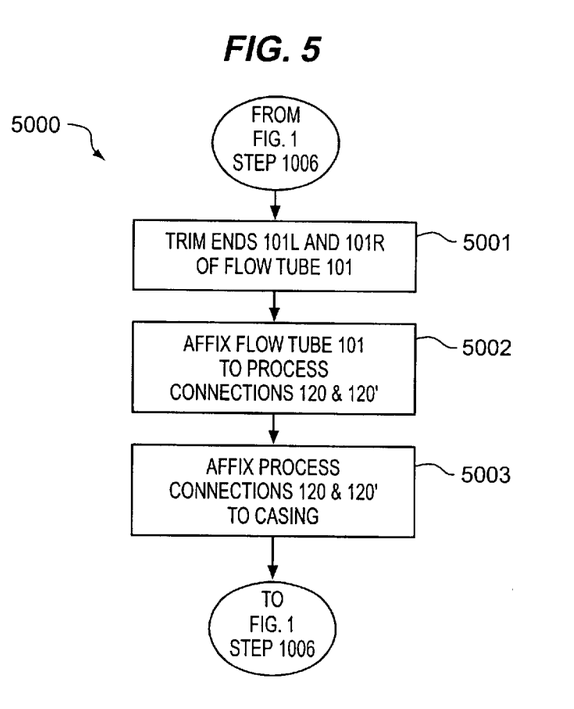
FIG. 5 illustrating a preferred method for affixing process connections to a flowmeter in this invention.

After flow tube assembly 150 is connected to at least two points inside casing 103, casing 103 is sealed in step 1005. Process 4000 illustrated in FIG. 4 is a preferred embodiment of a process for sealing casing 103. Process 4000 begins in step 4001 by sealing access openings 1001. In a preferred embodiment, openings 1001 are sealed by welding plugs 1101 (See FIG. 11) into openings 1004. The plugs are preferably made of the same material as casing 103. After the access openings are sealed, a pneumatic test is performed in step 4002. A pnuematic test is a conventional test that determines whether casing 103 can withstand a predetermined pressure. After the pneumatic test is performed, a pneumatic access is sealed in step 5003.

After the pneumatic access opening is sealed, veneer 1100 (FIG. 11) is affixed to casing 103 to enclose casing 103 in step 4004. Veneer 1100 is made of stainless steel and encloses casing 101 to provide a sanitary surface. A complete description of a veneer 1100 is provided in a patent application titled "Veneer for a casing of a Coriolis Flowmeter" assigned to Micro Motion Inc. and filed the same day as this application.

In a preferred embodiment, veneer 1100 is affixed in a following manner. First veneer 1100 is wrapped around casing 103. The ends 1104 and 1105 are then welded or in some other way affixed to case ends 133. In the preferred embodiment, the veneer 1100 is affixed in the following manner. First, a longitudinal weld affixes sides 1102 and 1103 to one another. The circumference of ends 1104 and 1105 are then welded to case ends 132. After veneer 1100 is affixed to casing 103, process 5000 ends and returns to step 1005 of process 1000.

After casing 103 is sealed in step 1005, process connections 120–120' (See FIG. 12) must be connected to flow tube 101 and case ends 133 in step 1006 to complete process 1000. This connection provides a third connection between flow tube assembly 150 and casing 103 to provide greater stability to the flowmeter. A complete discussion of three connections between a flow tube and casing is given in a patent application titled "Apparatus for Connecting A Coriolis Flowmeter Flow Tube to A Flowmeter Case" assigned to Micro Motion Inc. and filed on the same day as this patent application.

Process 5000 is a preferred method for affixing process connections 120–120'. First, ends 101L and 101R of flow tube 101 are trimmed to extend a predetermined amount out from case ends 133 in step 5001. This is done to provide uniformity for connections.

Next, process connections 120 and 120' are inserted over flow tube ends 101L and 101R in step 5002. Process connections 120–120' are formed of two different metals. In the preferred embodiment, the two metals are titanium like flow tube 101 and stainless steel such as case ends 133. The titanium encloses at least a portion of an aperture extending through process connection 120–120'. For a complete description of a process connection 120–120' of the preferred embodiment please refer to a patent application titled "A Coriolis Flowmeter Bi-metallic Process Connection" assigned to Micro Motion Inc. and filed on the same day as this application.

In step 5003, process connection 120–120' is connected to casing 103. After process connections 120–120' are affixed to case ends 133, process 5000 ends with process connections 120–120' being affixed to flow tube 101. The ends 101L and 101R of flow tube 101 are affixed to the portion of process connection 120–120' that is made of the same metal as flow tube 101 and encloses the aperture. In a preferred embodiment this portion is an insert 121–121'(See FIG. 12) that affixes to an end of process connection 120–120'. This is to provide a flow path made of a single metal, such as titanium. Insert 121–121' is connected to ends of flow tube 101 with a conventional weld in a preferred embodiment. Process 5000 ends and returns to step 1006 of process 1000 which ends.

The above is a complete method for manufacturing a straight tube Coriolis flowmeter. It is expected that those skilled in the art can and will design alternative systems that infringes on the invention as set forth in the claims below either literally or through the Doctrine of Equivalents.

What is claimed is:

1. A method for manufacturing a Coriolis flowmeter having a straight flow tube made of a first metal, said method comprising the steps of:
    joining said straight flow tube to a balance bar that is oriented substantially parallel to a longitudinal axis of said straight flow tube and that encloses a portion of said straight flow tube wherein said joined flow tube and balance bar form a flow tube assembly;
    installing a drive system and sensors to said straight flow tube and said balance bar;
    inserting said flow tube assembly into an aperture in a casing wherein said casing is made of a second metal that is dissimilar to said first metal;
    affixing each end of said flow tube assembly to at least two points in said casing;
    enclosing said flow tube assembly in said casing; and
    sealing access openings in said casing responsive to enclosing said flow tube assembly.

2. The method of claim 1 wherein said step of affixing each end of said flow tube assembly comprises the steps of:
    affixing case connects to opposing ends of said flow tube assembly proximate ends of said balance bar; and
    connecting said case connects to transition brackets on an interior surface of said casing at opposing ends of said casing wherein said transition brackets are made of a metal that has properties that are substantially similar to said first metal.

3. The method of claim 2 wherein said step affixing said case connects comprises the step of:
    vacuum brazing said case connects and said balance bar to said straight flow tube to form said flow tube assembly.

4. The method of claim 2 wherein said step of connecting said case connects comprises the step of:
    welding said case connects to said transition brackets.

5. The method of claim 1 wherein step of affixing each end of said flow tube assembly to at least two points of comprises the step of:
    joining each end of said flow tube to a case end made of a third metal.

6. The method of claim 5 wherein said step of affixing each end of said flow tube assembly to at least two points in said casing comprises the steps of:
    affixing said case ends to opposing ends of said aperture through said casing to enclose said casing wherein said case ends have an opening through which said straight flow tube protrudes.

7. The method of claim 6 wherein said step of affixing said case ends comprises the step of:
    welding said case ends to said casing.

8. The method of claim 7 wherein said step of affixing said case ends comprises the step of:
    tacking said case ends in place prior to welding said cases ends to said casing.

9. The method of claim 6 wherein said joining said flow tube and said case ends comprises step of:
    inserting a brazing material into said case end; and
    induction brazing said flow tube to said case end.

10. The method of claim 6 wherein said joining said flow tube and said case ends comprises step of:
    vacuum brazing a transition piece made of a metal having properties substantially similar to said first metal and said second metal onto said flow tube responsive to affixing said balance bar to said flow tube; and
    plug-welding said transition piece to said case end.

11. The method of claim 1 further comprising the step of:
    connecting wires connected to said driver, pick-off sensors, and temperature sensors to wires associated with said case responsive to inserting said straight flow tube and said balance bar into said casing.

12. The method of claim 1 further comprising the step of:
    performing a pneumatic test responsive to said sealing of said access openings to test structural integrity of said casing.

13. The method of claim 12 further comprising the step of:
    sealing a pneumatic access opening responsive to completing said pneumatic test.

14. The method of claim 1 further comprising the step of:
    enclosing said casing in a veneer.

15. The method of claim 14 wherein said step of enclosing said casing in said veneer comprises the step of:
    welding a first side longitudinally to a second side of said veneer; and
    welding a circumference of each end of said veneer to a case end.

16. The method claim 1 further comprising the step of:
    affixing process connections to opposing ends of said flow tube and said casing responsive to affixing each end of said straight flow tube to at least two points of said casing.

17. The method of claim 16 further comprising the steps of:
- inserting each end of said flow tube into an aperture through one of the process connections;
- welding each end of said flow tube to a portion of each said process connection made of s aid first metal; and
- joining each said process connection to opposing case ends.

18. A method for assembling a Coriolis flow meter having a straight flow tube made of a first metal, said method comprising the steps of:
- joining said straight flow tube and an enclosing balance bar at opposing ends of said balance bar, said balance bar is made of a metal having substantially identical properties to said first metal and is oriented parallel to a longitudinal axis of said straight flow tube;
- affixing a case connect to each end of said straight flow tube and said balance bar, each said case connect is made of a metal that can be joined with said first metal and a second dissimilar metal;
- inserting said flow tube and said balance bar into an aperture extending through a casing made of said second dissimilar metal;
- affixing each end of said flow tube and said balance bar to at least two points in said casing;
- joining each said case connect to an interior of said casing;
- enclosing said flow tube and said balance bar in said casing; and
- sealing access openings in said casing responsive to enclosing flow tube and said balance bar.

19. A method for assembling a Coriolis flow meter having a straight flow tube made of a first metal, said method comprising the steps of:
- joining said straight flow tube and an enclosing balance bar at opposing ends of said balance bar wherein said balance bar is made of a metal having substantially identical properties to said first metal and is oriented parallel to a longitudinal axis of said straight flow tube;
- inserting said flow tube and said balance bar into an aperture extending through a casing made of a second dissimilar metal;
- affixing a case connect to each end of said flow tube and said balance bar, each said case connect is made of a metal that can be joined with said first metal and said second dissimilar metal;
- affixing said straight flow tube and balance bar to an interior of said casing;
- joining case ends to opposing ends of said aperture of said casing to enclose said casing wherein said case ends include apertures through which said flow tube protrudes and are made of said second dissimilar metal;
- inductively brazing said flow tube to said case ends responsive to joining said case ends; and
- sealing access openings in said casing.

20. A method for manufacturing a Coriolis flowmeter having a straight flow tube made of a first metal, said method comprising the steps of:
- joining said straight flow tube to a balance bar that is oriented substantially parallel to a longitudinal axis of said straight flow tube and that encloses a portion of said straight flow tube, said joined flow tube and balance bar form a flow tube assembly;
- installing a drive system and sensors to said straight flow tube and said balance bar;
- inserting said flow tube assembly into an aperture in a casing made of a second metal that is dissimilar to said first metal;
- affixing each end of said flow tube assembly to at least two points in said casing by joining each end of said flow tube to a case end made of the second metal; said step of affixing each end of said flow tube assembly comprises the steps of:
- affixing case connects to opposing ends of said flow tube assembly proximate ends of said balance bar by vacuum brazing said case connects and said balance bar to said straight flow tube to form said flow tube assembly, and
- by welding said case connects to transition brackets on an interior surface of said casing at opposing ends of said casing, said transition brackets are made of a metal that has properties that are substantially similar to said first metal;
- said step affixing said case connects comprises the steps of;
- welding or tacking said case ends to opposing ends of said aperture through said casing to enclose said casing, said case ends have an opening through which said straight flow tube protrudes;
- inserting a brazing material into said case end; and induction brazing said flow tube to said case end;
- said step of joining said flow tube and said case ends comprises step of:
- vacuum brazing a transition piece made of a metal having properties substantially similar to said first metal and said second metal onto said flow tube responsive to affixing said balance bar to said flow tube, and plug- welding said transition piece to said case end;
- said method further comprising the step of connecting wires connected to said driver, pick-off sensors, and temperature sensors to wires associated with said casing responsive to inserting said straight flow tube and said balance bar into said casing;
- said method further comprises the steps of:
- enclosing said flow tube assembly in said casing;
- sealing access openings in said casing responsive to enclosing said flow tube assembly;
- performing a pneumatic test responsive to said sealing of said access openings to test structural integrity of said casing;
- sealing a pneumatic access opening responsive to completing said pneumatic test;
- enclosing said casing in a veneer by
- welding a first side longitudinally to a second side of said veneer; and
- welding a circumference of each end of said veneer to a case end;
- said method further comprises the steps of:
- affixing process connections to opposing ends of said flow tube and said casing responsive to affixing each end said straight flow tube at least two points of said casing;
- inserting each end into an aperture through a process connection;
- welding each end of said flow tube to a portion of each said process connection made of said first metal; and
- joining each said process connection to opposing case ends.

* * * * *

UNITED STATES PATENT AND TRADEMARK OFFICE
CERTIFICATE OF CORRECTION

PATENT NO.   : 6,374,478 B1
DATED        : April 23, 2002
INVENTOR(S)  : Gregory Alan Neece et al.

It is certified that error appears in the above-identified patent and that said Letters Patent is hereby corrected as shown below:

Column 11,
Line 6, replace "said process connection made of s aid first metal; and" with
-- said process connection made of said first metal; and --

Signed and Sealed this

Eighteenth Day of February, 2003

JAMES E. ROGAN
*Director of the United States Patent and Trademark Office*